United States Patent [19]

Yasukawa et al.

[11] Patent Number: 5,049,917
[45] Date of Patent: Sep. 17, 1991

[54] CAMERA SYSTEM

[75] Inventors: Seiichi Yasukawa, Kawasaki; Tetsuro Goto, Funabashi; Takashi Saegusa, Kawasaki; Tsutomu Wakabayashi; Norikazu Yokonuma, both of Tokyo, all of Japan

[73] Assignee: Nikon Corporation, Tokyo, Japan

[21] Appl. No.: 355,359

[22] Filed: May 23, 1989

[30] Foreign Application Priority Data

May 24, 1988 [JP] Japan .................. 63-124837

[51] Int. Cl.$^5$ ............................. G03B 7/26
[52] U.S. Cl. .................................. 354/484
[58] Field of Search ........................ 354/484

[56] References Cited

U.S. PATENT DOCUMENTS 4,695,148 9/1987 Terui et al. ............ 354/484
4,924,251 5/1990 Ishimura et al. ............ 354/484

FOREIGN PATENT DOCUMENTS 62-115141 1/1981 Japan .
61-260230 5/1985 Japan .

Primary Examiner—W. B. Perkey
Assistant Examiner—Cassandra C. Spyrou
Attorney, Agent, or Firm—Shapiro and Shapiro

[57] ABSTRACT

There is disclosed a camera system consisting of accessories such as a speed light, a data back etc. and a camera capable of mounting these accessories, and capable of data communication between the camera and the accessory. When the power supply of the camera is turned off, a power supply activating signal is sent as a hardware signal from the accessory to the camera by the manipulation of the accessory. When the power supply of the camera is turned on, a power supply-extending signal is sent as a software signal from the accessory to the camera by the manipulation of the accessory. The camera holds the operation of the power supply for a predetermined period from the latest entry of the power supply activation signal or the power supply extending signal.

5 Claims, 8 Drawing Sheets

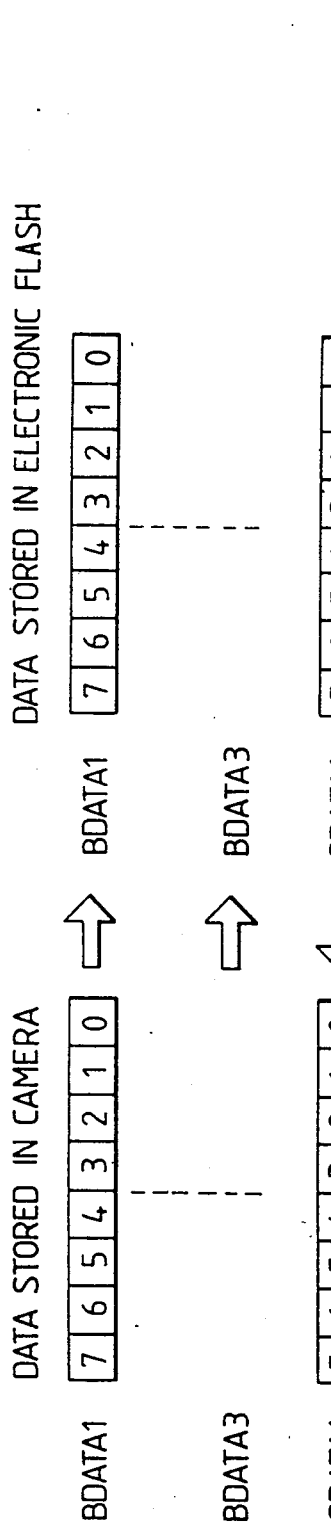
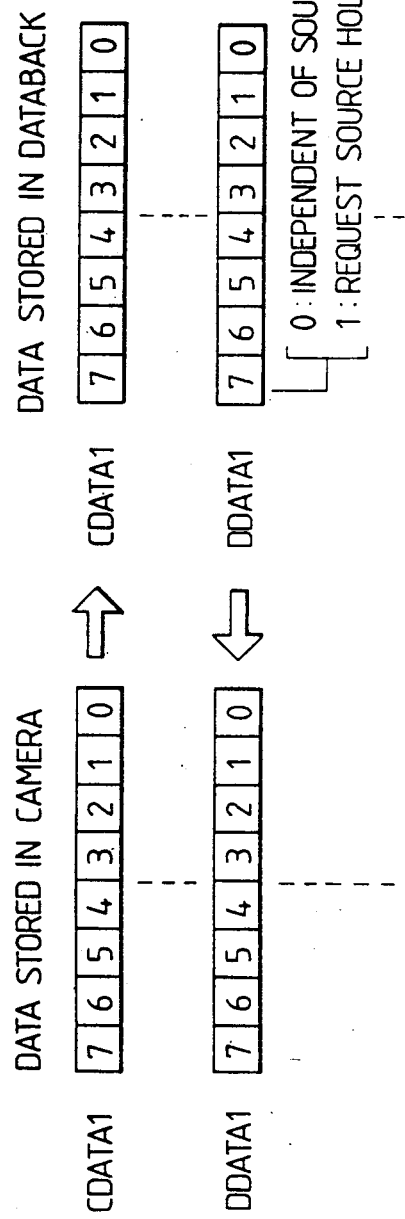

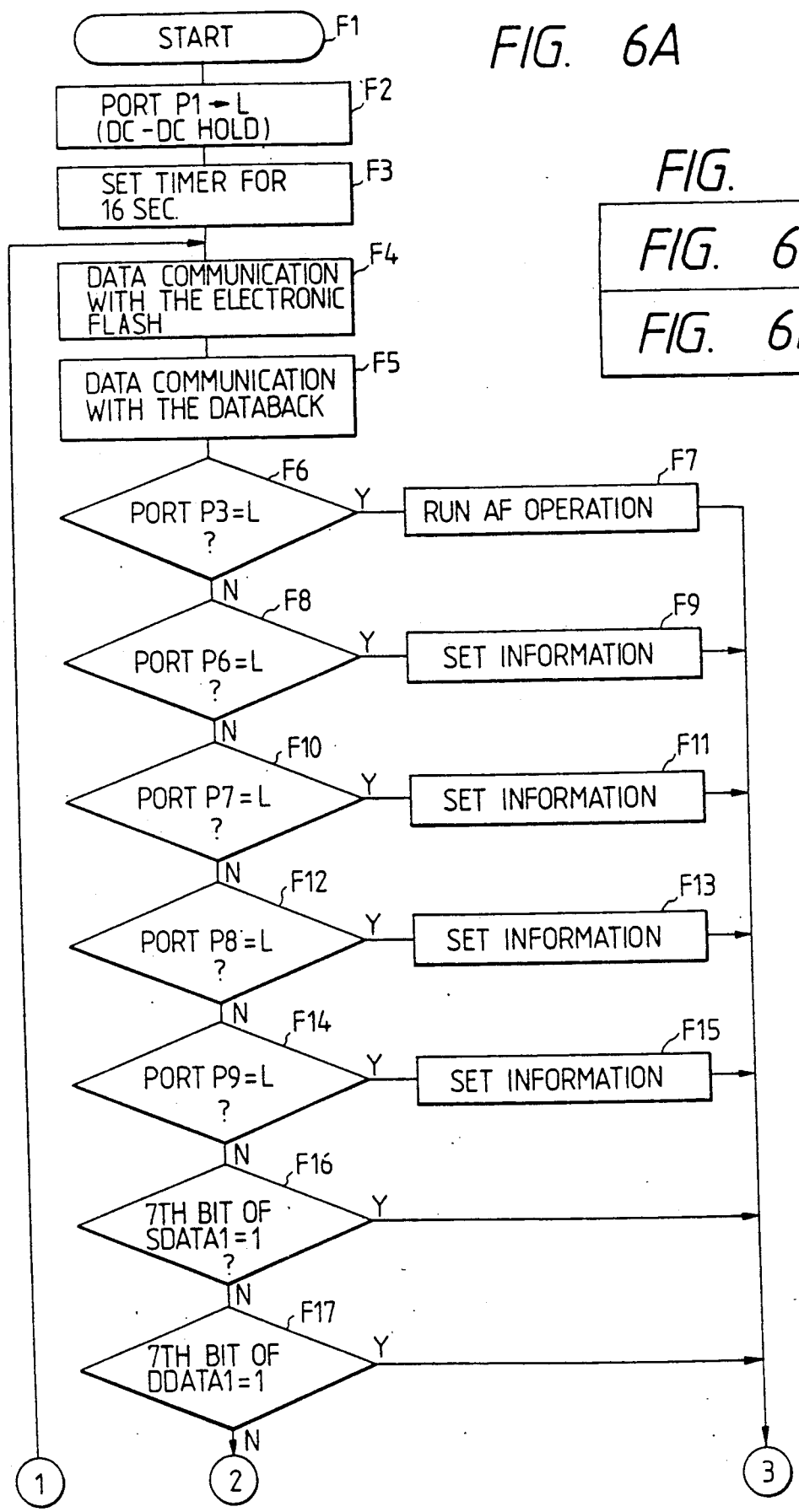

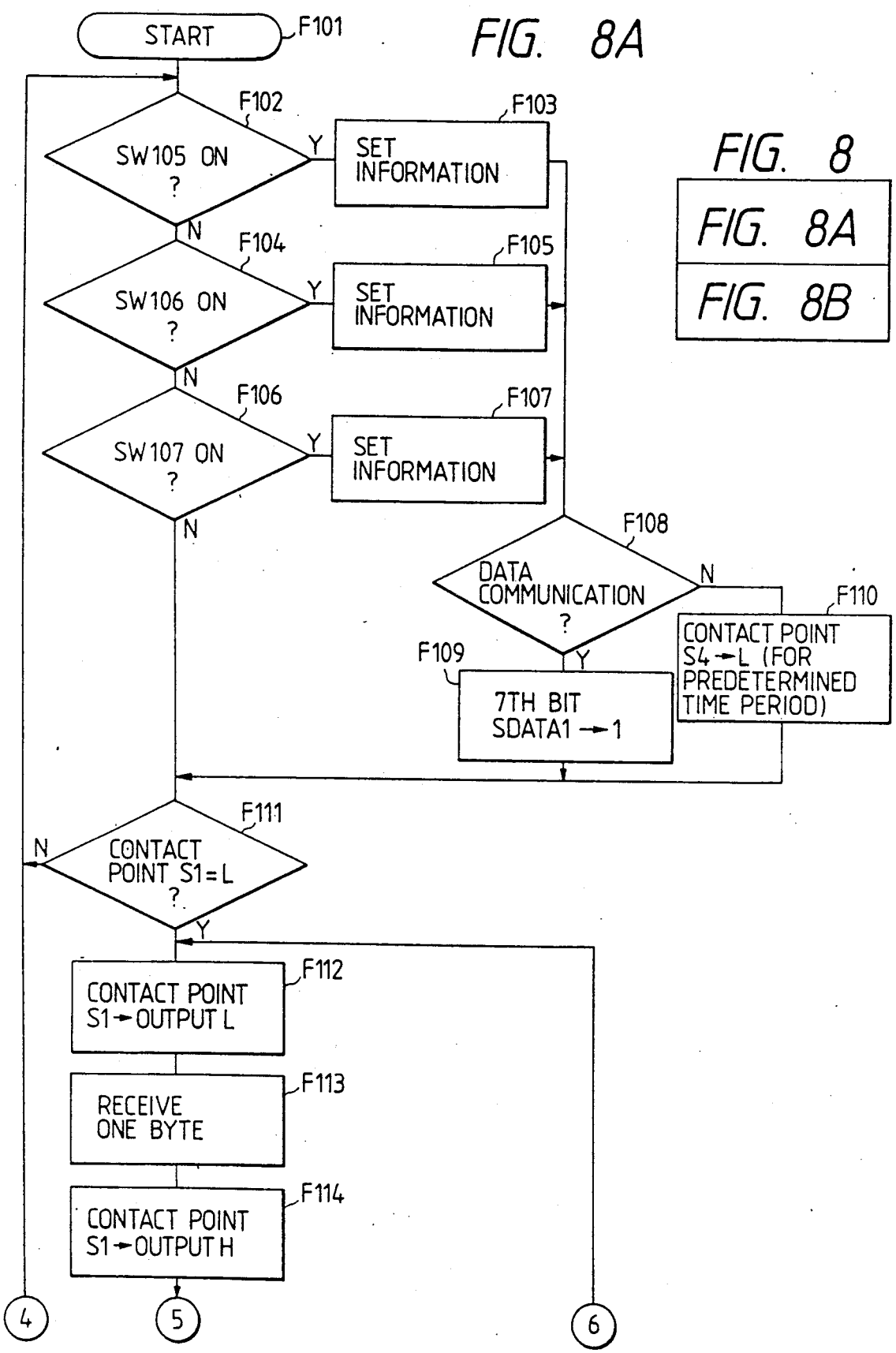

CAMERA SYSTEM

BACKGROUND OF THE INVENTION

1. Field of the Invention

The present invention relates to a camera system which can be connected to a flash unit or a data back.

2. Related Background Art

There are already known various cameras to which various accessories such as a flash unit or a data back can be connected. With recent advances in the camera systems, various functions are incorporated not only in the camera itself but also in the accessories to be connected thereto, for increasing the functions not only of the accessory but also of the camera itself. Examples of such functions include auxiliary light control or flash synchronization with the trailing shutter curtain in the TTL light control with a flash unit, and an auto bracketing function for stepwise correction of exposure or an extended exposure function in a data back. Such functions are not simply achievable only in the accessory, but require information transfer of the function to the camera body, and reception of various data therefrom. For achieving such functions, setting means for such functions are provided on the accessory, and the state of the function setting is electrically transmitted to the camera through certain electrical contacts, and data are received from the camera. Since the number of such contacts is limited in space and cost, there is generally employed a method of exchanging necessary data collectively in digital form, in serial data communication.

In order to effect such serial data communication between the accessory and the camera body, the power supply has to be turned on in both units. In cameras, simple power supply which activates the camera only during the turned-on state of a power switch has become unpopular, because of trouble when the user forgets to turn off the switch. For this reason, there is commonly employed a structure containing a so-called power supply holding timer which automatically turns off the power supply to a negligible level after a predetermined time and restores the power supply in response, for example, to a half-stroke depression of the shutter release button. Stated differently, the power supply is turned off if the camera is left untouched. Consequently, when the buttons of the accessory are manipulated for executing the functions incorporated therein, serial data communication for setting or executing such functions is not conducted between the camera and the accessory in a state in which the power supply holding timer is turned off. In order to effect such communication it is necessary to manipulate the power supply activating means of the camera body each time. Japanese Laid-open Patent Sho 61-260230 for an electronic flash and Japanese Laid-open Patent Sho 62-115141 for an activating device for a camera system have proposed solutions to this drawback, by providing means for activating the power supply of the camera from the accessory, and means for activating the camera body from the accessory, when data communication with the camera body is required. Such structures can prevent the above-mentioned drawback as data communication is enabled by automatic activation of the power supply of the camera for example at the function setting in the accessory.

However, there still exists another drawback in the convenience of use. More specifically, in the structure in which the camera body can be activated by the manipulation of the accessory when it has no data communication with the camera body, the power supply holding timer of the camera is turned off after a predetermined time while the user continues the setting operation on the accessory, whereby the setting operation becomes wasted. For solving this drawback, it is possible to send the signal of the activating means of the accessory also to the power supply holding timer during data communication, thereby constantly retriggering the power supply holding timer. However, since such activating means is often composed in a common signal line with switch means to be turned on by a half-stroke depression of a shutter release button which constitutes power supply activating means in the camera and which also triggers other operations such as automatic focusing, there may result other drawbacks such as the activation of the automatic focusing by the manipulation of a button in the accessory.

SUMMARY OF THE INVENTION

In consideration of the foregoing, an object of the present invention is to provide a camera system capable of activating the power supply in the camera when a function setting operation is conducted in the accessory while the power supply holding timer in the camera is turned off to deactivate the power supply therein, and of extending the operation of the power supply holding timer of the camera without the activating means if a function setting operation is conducted in the accessory while the camera is activated by the power supply holding timer thereof.

Another object of the present invention is to provide a camera system, comprising a camera and at least an accessory mountable thereon and capable of data communication between said camera and each accessory through signal transfer means when said accessory is mounted on the camera, comprising, first means provided on each of said accessories for sending an activation signal to said camera for activating the power supply of said camera; second means provided on each of said accessories for sending an extension signal to said camera for extending the operation of the power supply of said camera; means provided in said camera, for activating the power supply thereof in response to said activation signal from said accessory; and timer means provided in said camera, for maintaining the power supply of the camera for a predetermined from the entry of said activation signal or said extension signal from said accessory.

Still another object of the present invention is to provide a camera system, comprising a camera and at least an accessory mountable thereon and capable of data communication between said camera and each accessory through signal transfer means when said accessory is mounted on the camera, comprising, at least a means provided on each of said accessories for setting a function relating to said accessory; means provided on each of said accessories for discriminating whether said camera is in activated state or not; first means provided on each of said accessories for sending, to the camera, an activation signal for activating the power supply thereof in response to the manipulation of said setting means when said discriminating means identifies the non-activated state of the camera; second means provided on each of said accessories for sending an extension signal for extending the operation of the power supply of the camera in response to the manipulation of said setting means when said discriminating means identifies the activated state of the camera; means provided in said camera for activating the power supply of the camera in response to said activation signal from said accessory; and timer means provided in said camera, for holding the power supply of the camera for a predetermined period from the entry of said activation signal or said extension signal from said accessory.

According to the present invention, no particular circuit or hardware is employed, but software is added to the camera and the accessory, and, it is rendered possible, in this manner, to activate the power supply of the camera from the conventional accessory and to extend the function of the timer means for holding the power supply of the camera by means of a manipulation of the accessory, without any undesirable effect on the function of the camera.

More specifically, according to the present invention, in a camera system in which various functions can only be attained through information exchange between the camera body and the accessory, the user can activate the entire system and start a function setting operation, by the manipulation of a predetermined operating member, regardless of which unit of the system said operating member is located. Also the system remains active not only during the manipulations of the user but also for a predetermined period thereafter, so that the user can set the function or enter data smoothly, without any concern for the power supply of the camera. Although the system is not changed in the achievable functions, it has evident advantage in the improved ease of use.

The foregoing and still other objects of the present invention, and the advantages thereof, will become fully apparent from the following description, which is to be taken in conjunction with the attached drawings.

BRIEF DESCRIPTION OF THE DRAWINGS

FIG. 4 is a view showing the format of serial data exchanged between the camera and the flash unit;

FIG. 5 is a view showing the format of serial data exchanged between the camera and a data back;

DESCRIPTION OF THE PREFERRED EMBODIMENTS

Figure 1:
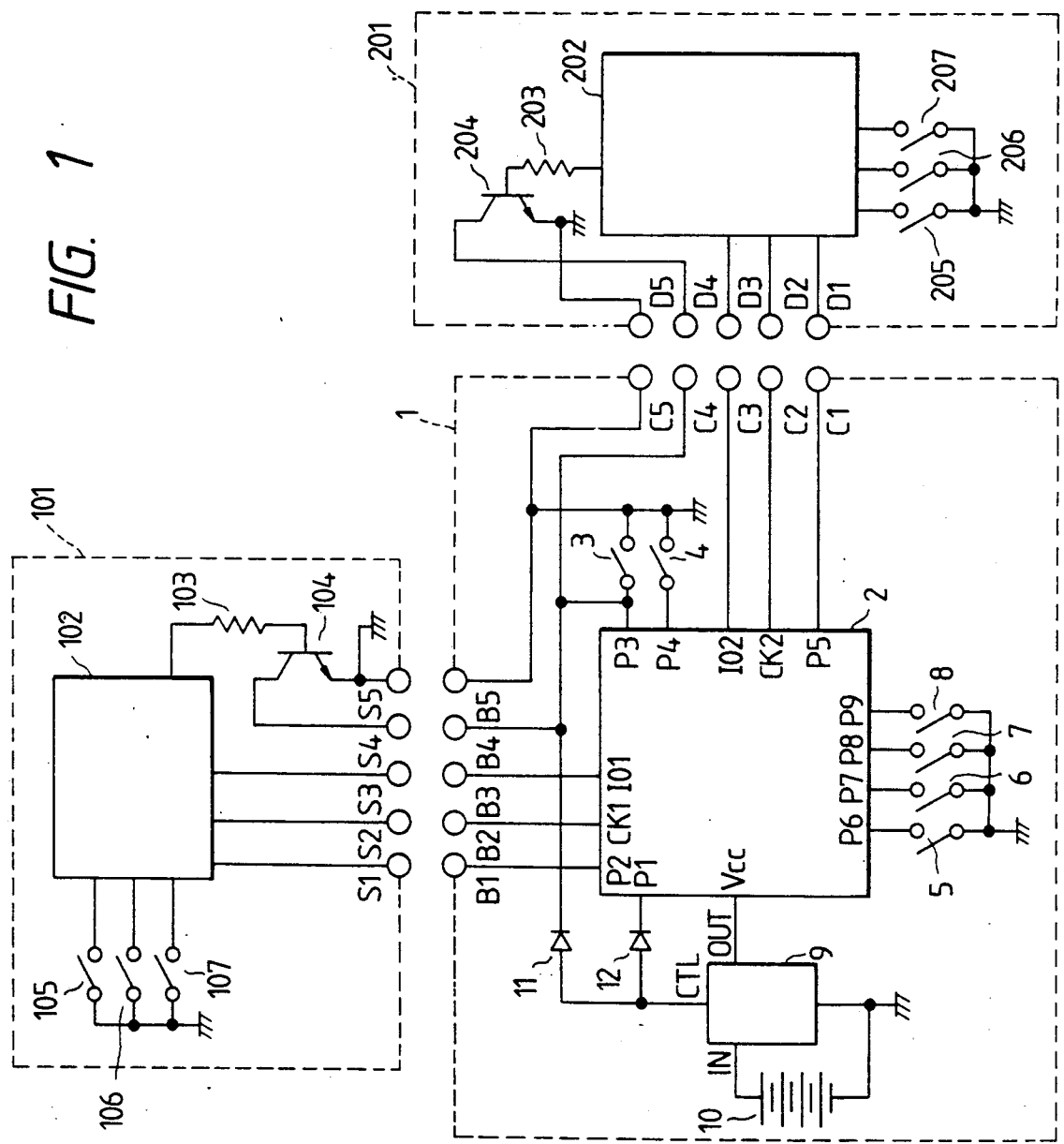
FIG. 1 is a block diagram showing the circuit structure of an embodiment of the present invention.

FIG. 1 is a block diagram of the circuit structure of an embodiment of the present invention, which will be explained in the following.

The present embodiment is composed of a camera 1, a flash unit 101 and a data back 201 each connectable with the camera 1 through contacts. The camera 1 has contacts B1-B5 for connection with corresponding contacts S1-S5 of the flash unit 101, and contacts C1-C5 for connection with corresponding contacts D1-D5 of the data back 201.

The camera 1 is provided with a microcomputer ($\mu c$) 2 powered by the output of a DC-DC converter 9, in turn powered by a battery 10. The contacts B1, B2, B3 for the flash unit 101 are respectively connected to input/output ports P2, CK1, IO1 of the microcomputer 2, and the contacts C1, C2, C3 for the data back 201 are respectively connected to input/output ports P5, CK2, IO2 of the microcomputer 2. Switches 3, 4 are two-step switches linked to a shutter release button (not shown), in which the switch 3 is closed by a half-stroke depression of said shutter release button, while the switch 4 is closed by a full-stroke depression of said button. A contact member of each of the switches 3, 4 is grounded. The other contact member of the switch 3 is connected to a pulled-up input port P3 of the microcomputer 2, and also to the contacts B4, C4 and the cathode of a diode 11. The other contact member of the switch 4 is connected to a pulled-up input port P4 of the microcomputer 2. The anode of the diode 11 is connected to a terminal CTL of the DC-DC converter 9, together with the anode of a diode 12 which is connected to an output port P1 of the microcomputer 2. Said terminal CTL of the DC-DC converter 9 is a control input terminal for selectively supplying a stabilized constant voltage converted from the voltage of the battery. Information setting switches 5-8 are respectively turned on in linkage with operating members of the camera body, for setting operating modes or data, wherein contact members at one side of said switches are grounded while the other contact members thereof are respectively connected to pulled-up input ports P6-P9 of the microcomputer 2. The contacts B5 and C5 are both grounded in the camera. In addition the camera 1 is provided with shutter control means, light metering means, display means etc. which are not illustrated.

The flash unit 101 is provided with a microcomputer 102, of which input/output ports are connected to the contacts S1-S3. The contact S4 is connected to the collector of an NPN transistor 104, of which the emitter is grounded while the base is controlled by one of the output ports of the microcomputer 102 through a resistor 103. The contact S5 is grounded. Switches 105-107 are respectively turned on, in linkage with the actuation of unrepresented function setting members provided on the flash unit 101, and the contact members at one side of said switches are grounded, while the other contact members of said switches are respectively connected to pulled-up input ports of the microcomputer 102. In addition the flash unit 101 is provided with a power source, voltage elevating means, light emission means, emission control means etc. which are not shown.

The data back 201 is provided with a microcomputer 202, of which input/output ports are connected to the contacts D1-D3. The contact D4 is connected to the collector of an NPN transistor 204, of which emitter is grounded while the base is controlled by one of the output ports of the microcomputer 202 through a resistor 203. The contact D5 is grounded. Switches 205-207 are respectively turned on in linkage with the actuation of function setting members (not shown) provided on the data back 201, and contact members at one side of said switches are grounded, while the other contact members of said switches are connected to input ports, with pull-up resistors, of the microcomputer 202. In addition the data back 201 is provided with a power source, data display means, data photographing means etc. which are not illustrated.

In the following there will be explained the function of the camera 1 when both the flash unit and the data back are mounted on said camera body.

At first the power supply in the camera 1 is activated by a half-stroke depression of the shutter release button by the user. In response to said depression, the half-stroke switch 3 is closed whereby the terminal CTL of the DC-DC converter 9 assumes the L-level through the diode 11. Thus the DC-DC converter 9 supplies power. Upon receiving the power, the microcomputer 2 is reset within a short period by an incorporated initializing function, and then starts program execution, according to flow charts shown in FIGS. 6 and 7. At first, in a step F2 in FIG. 6, the microcomputer 2 shifts the output port P1 to the L-level to retain the terminal CTL of the DC-DC converter 9 at the L-level, thereby securing the output of said converter 9 as the power source for said microcomputer. Consequently the half-stroke switch 3 needs only to be maintained closed until this point. Then a step F3 sets a timer TMR1 at 16 seconds which is the duration of the power supply holding timer, and starts time measurement.

Figure 8B:
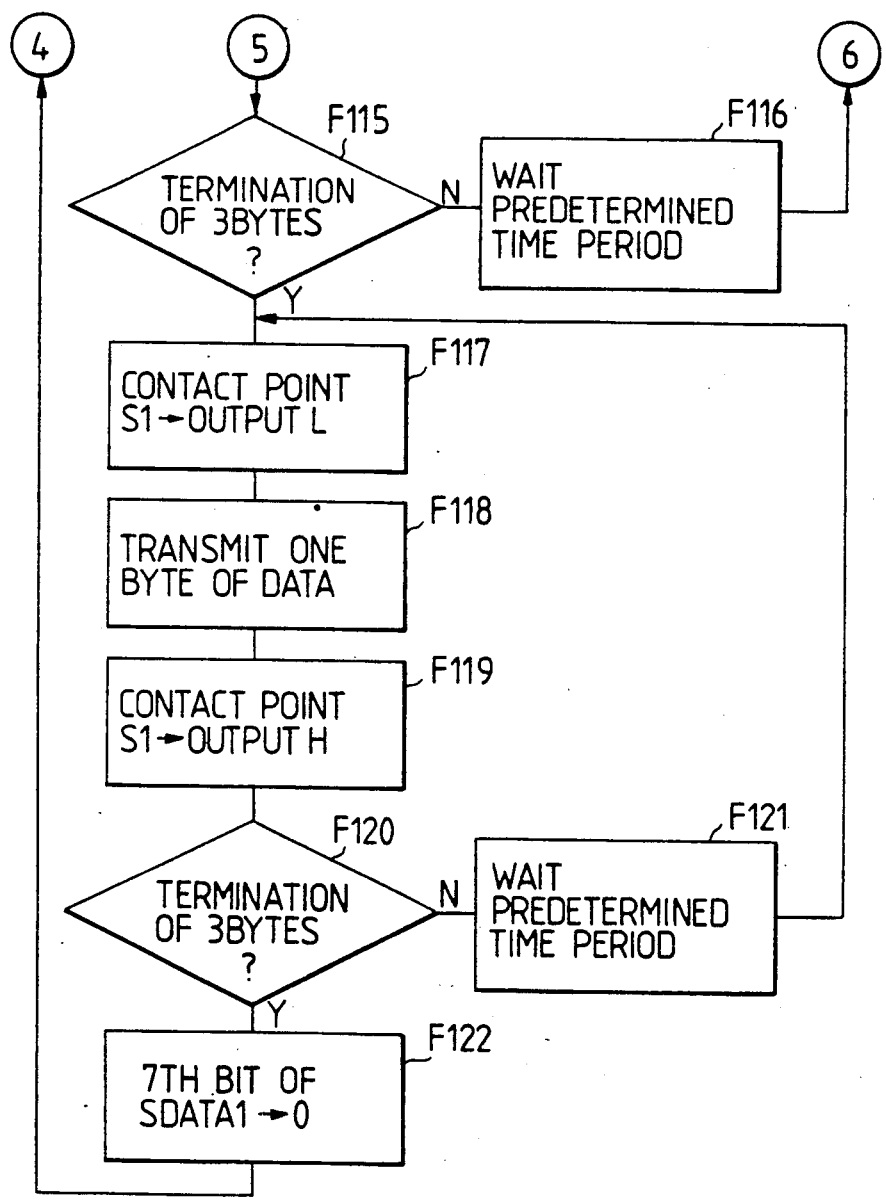
FIG. 8, consisting of FIGS. 8A and 8B, is a flow control sequence of a microcomputer $\mu C102$ of the flash unit.

In the following there will be explained the case of activating the power supply of the camera body from the flash unit 101. The function of the microcomputer 102 of said flash unit 101 is shown in a flow chart shown in FIG. 8, in which a loop is repeated as long as a power switch (not shown) is closed. Steps F102, F104, and F106 inspect the state of the function setting switches 1015-107, and, if any of said switches is closed, there is conducted a corresponding setting operation F103, F105, F107, and the sequence proceeds to a step F108. On the other hand, if all the switches are open, the sequence proceeds to a step F111. The step F108 discriminates whether there has been data communication with the camera within a predetermined past period. If data communication has been made, a step F109 sets the 7th bit of transmission data SDATA1 to the camera at "1", and the sequence proceeds to a step Flll. On the other hand, in the absence of data communication with the camera in the predetermined past period, a step F110 produces a signal for turning on transistor 104 for maintaining the contact S4 at the L-level for a predetermined period, for example 30 msec., and the sequence proceeds then to the step Flll. A data communication flow from the step Flll to F122 will be explained later. In this flow, the activation of the power supply of the camera 1 from the flash unit 101 is conducted in the step F110. This step transmits the activation of the power supply to the camera through hardware means, by maintaining the contact S4 at the L-level for a predetermined period, in response to the manipulation of a function setting member in the flash unit 101, in an interval of data communications repeated regularly.

The activation of the power supply of the camera 1 from the data back 201 can also be conducted in a similar manner. Although the flow chart and the detailed explanation will be omitted, said activation is achieved by maintaining the contact D4 at the L-level for a predetermined period, in response to the manipulation of a function setting member of the data back 201, in an interval of data communications repeated regularly.

Figure 2:
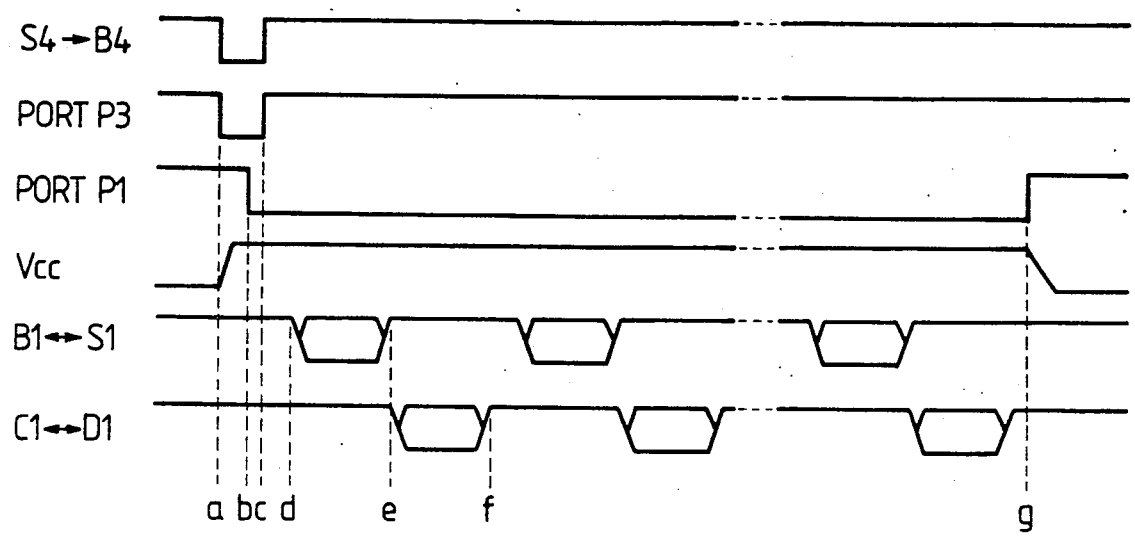
FIG. 2 is a timing chart of the functions of said embodiment when the camera is activated from a flash unit.

When the camera 1 receives a power supply activating signal through the contacts S4 and B4 or the contacts D4 and C4 (a-c in FIG. 2), the hardware condition in said camera body is identical with when the half-stroke switch therein is closed. Thereafter the microcomputer 2 is activated as explained above, maintaining the output port P1 at the L-level to hold the output of the DC-DC converter 9 (b in FIG. 2) and setting the power supply holding timer (16 seconds).

Figure 3:
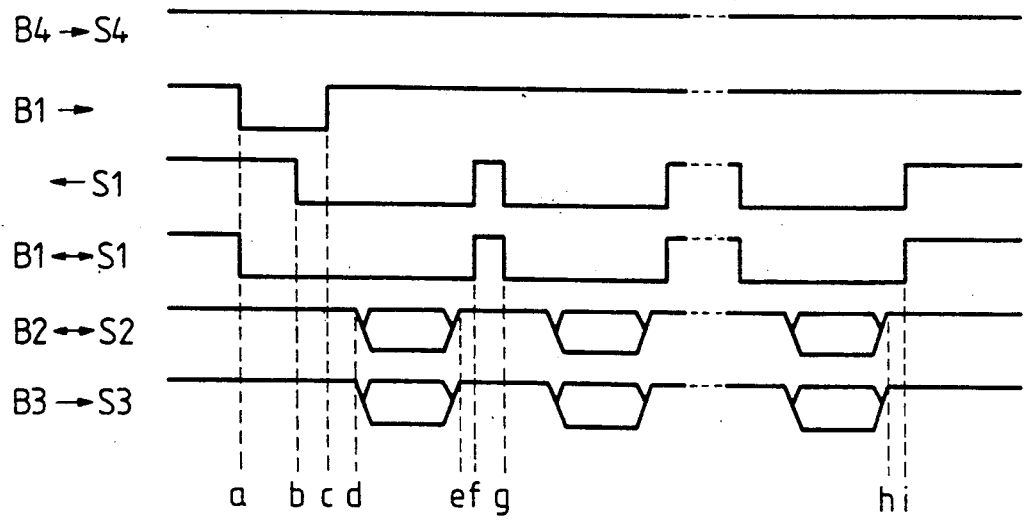
FIG. 3 is a timing chart of a serial data communication between the camera and the flash unit.
Figure 6B:
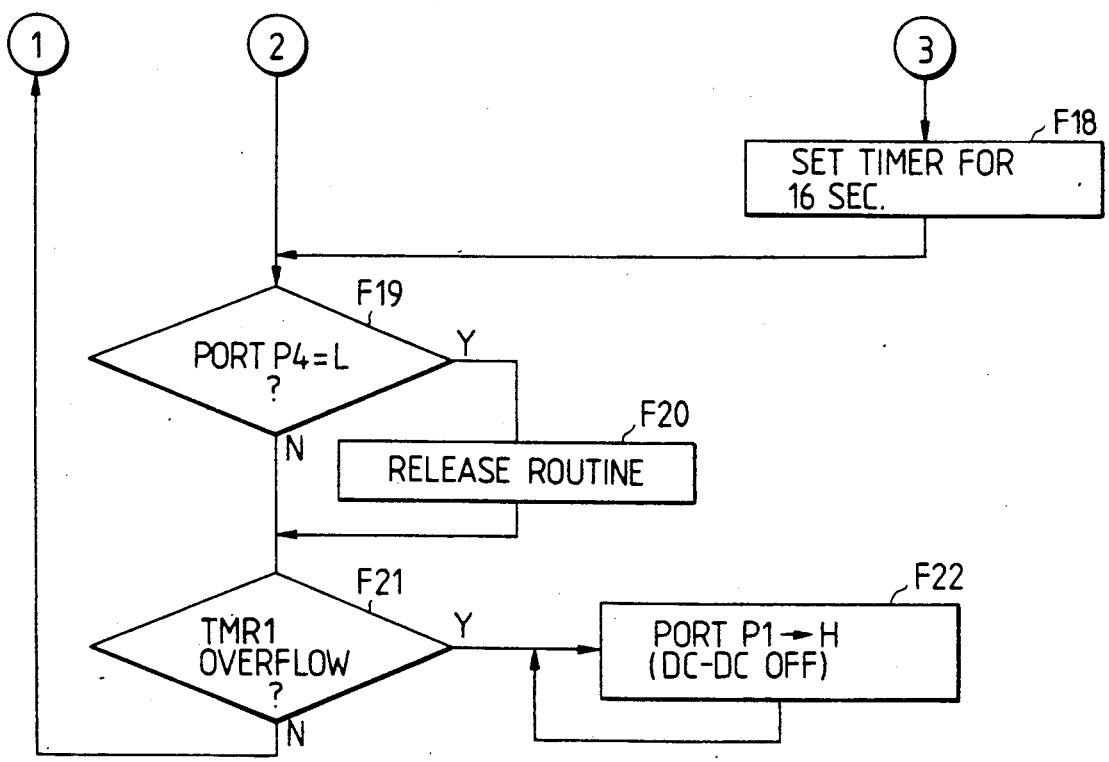
FIG. 6, consisting of FIGS. 6A and 6B, is a general flow chart of a microcomputer $\mu C2$ provided in the camera of the present embodiment.
Figure 7:
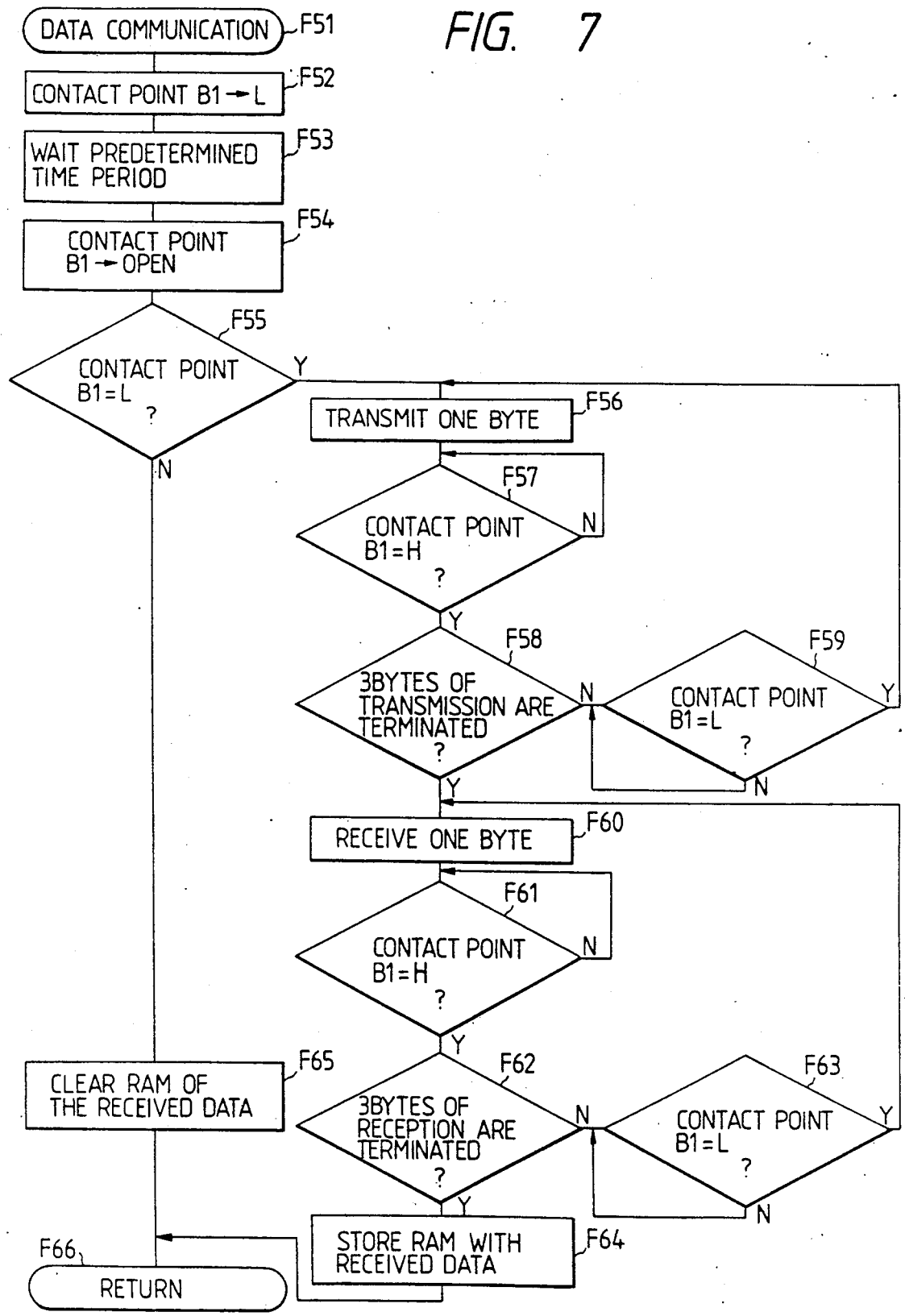
FIG. 7 is a flow chart of serial data exchange with the flash unit.

In the following there will be explained the data communication conducted in the steps F4, F5 in FIG. 6. A flow chart shown in FIG. 7 indicates the flow of data communication with the flash unit. The data communication with the data back, conducted in the step F5, is omitted as it is similar to that with the flash unit. FIG. 3 shows a timing chart of the data communication with the mounted flash unit. Referring to FIG. 7, steps F52-F54 maintain the contact B1 at the L-level for a predetermined period (a-c in FIG. 3), and then leave said contact open, thereby enabling input. At this point a step F55 discriminates the level of said contact B1, and, if it is in the L-level, the flash unit 101 is discriminated as mounted and the data communication is started. If the flash unit is not mounted, the contact B1 assumes the H-level because of the incorporated pull-up resistor, so that the sequence proceeds to a step F65 for clearing received data from the RAM. In the flash unit 101, if a step F111 in FIG. 8 identifies the L-level state of the contact S1, a step F112 shifts the contact S1 to the output mode and produces an L-level signal (b in FIG. 3) thereby indicating the enabled state of data communication to the camera 1 and awaiting clock signals and data of a first byte from the camera. When the sequence proceeds to a step F56 in FIG. 7, the camera 1 sends the data of the first byte to the flash unit 101 by serial transfer in synchronization with eight clock pulses through the contacts B2, B3 (d-e in FIG. 3). In the flash unit 101, upon reception of data of a byte in a step F113, a step F114 shifts the contact S1 to the H-level (f in FIG. 3), and a step F115 discriminates whether the reception of data of a predetermined number of bytes (3 bytes in the present embodiment) has been completed. If not completed, a step F116 waits for a predetermined time, and the step F112 again shifts the contact S1 to the L-level (g in FIG. 3) to repeat the serial data reception. In the camera 1, a step F57 awaits the H-level of the contact B1, and a step F58 discriminates whether the data transmission of three bytes has been completed. If not, a step F59 awaits the L-level state of the contact B1, and the sequence then returns to the step F56. On the other hand, if the transmission of 3 bytes from the camera body to the flash unit has been completed, both the camera 1 and the flash unit 101 enter a routine of data transfer from the flash unit to the camera body, in which the camera 1 repeats a loop of steps F60-F63 while the flash unit 101 repeats a loop of steps F117-F121 by a predetermined number of times (corresponding to 3 bytes in the present embodiment). In this case the clock signals are still transmitted from the contact B2 to S2, but the direction of flow of data is inverted. After the exchange of data of a series, the camera stores, in a step F64, the received data in the RAM and the sequence returns, while, in the flash unit 101, a step F122 sets the 7th bit of SDATA 1 at "0" and the sequence returns to the main routine.

The data transmitted or received in the present embodiment are composed of 3 bytes, with a format shown in FIG. 4. In the data SDATA1 from the flash unit 101 to the camera 1, the 7th bit is used for extending the operator of the power supply holding timer of the camera 1. Said bit, if "0", does not affect the function of the power supply holding timer in the camera 1, but, if "1", will reload said timer from the beginning from the time when said bit is recognized. The data communication with the data back 201 is conducted in the same manner as and succeeding to the communication with the flash unit 101.

In the following there will be explained the function while the power supply holding timer of the camera 1 is in operation, again referring to FIG. 6. A step F6 discriminates the state of the input port P3, or the state of the half-stroke switch, and, if it is in the L-level, a step F7 executes a part of the automatic focusing operation and the sequence proceeds to a step F18. If the half-stroke switch is in the H-level state, steps F8 to F15 discriminate the states of the input ports P6-P9, or the states of the information setting switches of the camera in succession, and, if any is in the L-level state, an information setting operation corresponding to the switch of L-level state is executed and the sequence proceeds to the step F18. If all the switches are in the H-level state, steps F16 and F17 discriminate, in succession, the 7th bit of the data SDATA1 received from the flash unit 101 and that of the data DDATA1 received from the data back 201, and the sequence proceeds to the step F18 if either is "1", or to a step F19 of both are "0". As explained above, the step F18 is executed immediately after the actuation of any of the half-stroke switch and the information setting switches, or the detection of a reloading bit "1" for the power supply holding timer at least in either of the data received from the flash unit and the data back, and 16 seconds are set in the timer TMR1 constituting the power supply holding timer. Stated differently, in response to the actuation of an information setting member of the camera or in response to the actuation of a setting member of an accessory, transmitted from said accessory, the power supply holding timer is always reset to thereafter hold the power supply for a predetermined period, thus contributing to the convenience of the user. After the step F18, a step F19 discriminates the state of the input port P4 or the state of the shutter release switch, and, if it is in the L-level state, a step F20 executes a shutter release routine. Then a step F21 discriminates the overflow of the timer TMR1, or the completion of time measurement of the power supply holding timer. In the absence of overflow, the sequence returns to the step F4 to form a main loop, but, in case of overflow, the sequence proceeds to a step F22 to shift the output port P1 to the H-level, thereby turning off the output of the DC-DC converter 9. Thus the power supply of the microcomputer 2 declines, but, in order to prevent erroneous operation by the retentive voltage, step F22 is repeated in a loop until the power supply is terminated.

In the above-explained flow, the power supply of the camera, if turned off, can be activated, in hardware means, by a half-stroke depression of the shutter release button of the camera body, or an actuation of the function setting members of the flash unit or the data back mounted on said camera. Thereafter the power supply holding timer is reloaded, by software means, by an actuation of the information setting members of the camera body, or the flash unit or data back mounted thereon, and the power supply of the camera body is turned off upon expiration of said power supply holding timer.

In the foregoing embodiment there has been shown a camera system capable of achieving the objects of the present invention, composed of a camera body and relatively common accessories such as the flash unit and the data back. However the present invention is also applicable to interchangeable lenses, a motor drive unit, a wireless control unit, an interval photographing control unit and any other accessories available presently or in the future.

As many apparently widely different embodiments of the present invention may be made without departing from the spirit and scope thereof, it is to be understood that the invention is not limited to the specific embodiments thereof except as defined in the appended claims.

What is claimed is:

1. A camera system including a camera and an accessory mountable thereon, and capable of data communication between said camera and said accessory mounted on said camera, comprising:
   circuit means provided in said camera;
   power supply means provided in said camera, for supplying power to said circuit means;
   timer means provided in said camera, for performing a counting operation to count a predetermined period and stop the supply of power from said power supply means to said circuit means after the count of said predetermined period;
   activating means provided in said accessory, for outputting an activation signal which causes said power supply means to start supplying power to said circuit means and causes said timer means to perform said counting operation;
   extending means provided in said accessory, for outputting an extension signal after the output of said activation signal, wherein said extension signal causes said timer means to perform said counting operation; and
   discriminating means provided in said accessory, for discriminating whether or not data communication between said camera and said accessory has been performed within another predetermined period, causing said activating means to output said activating signal when data communication between said camera and said accessory has been performed within the another predetermined period and causing said extending means to output said extending signal when data communication between said camera and said accessory has not been performed within the another predetermined period.

2. A camera system according to claim 1, wherein the data communication between said camera and said accessory is performed between the counting operations caused by said activation signal and said extension signal.

3. A camera system according to claim 1, which further comprises means for detecting the focus state of a phototaking lens between the data communication and the start of said counting operation according to said extension signal.

4. An accessory mountable on a camera which has power supply means and timer means for counting a predetermined period and stopping the supply of power from said power supply means after the count of said predetermined period, wherein said accessory mounted on said camera is capable of performing data communication to said camera, comprising:
   at least one setting means for setting a function relating to said accessory;
   activating means for outputting an activation signal which causes said power supply means to start the supply of power and causes said timer means to perform said counting operation;

extending means for outputting an extension signal which causes said timer means to perform said counting operation; and discriminating means, for discriminating whether or not data communication between said camera and said accessory has been performed within another predetermined period in response to manipulation of said setting means, causing said activating means to output said activating signal when data communication between said camera and said accessory has been performed within the another predetermined period and causing said extending means to output said extending signal when data communication between said camera and said accessory has not been performed within the another predetermined period.

5. A camera system according to claim 1, wherein said accessory has at least one setting means for setting a function relating to said accessory, and wherein said discriminating means discriminates whether or not data communication between said camera and said accessory has been performed within the another predetermined period in response to manipulation of said setting means.

* * * * *